United States Patent Office 3,542,608

Patented Nov. 24, 1970

3,542,608

METHOD FOR STIMULATING THE DRIFT OF LITHIUM THROUGH GERMANIUM CRYSTALS

Elmer W. Jensen, Mount Vernon, and Joseph F. Thiel, Yonkers, N.Y., assignors to Geoscience Instruments Corporation, Mount Vernon, N.Y., a corporation of New York No Drawing. Filed Apr. 1, 1968, Ser. No. 717,974
Int. Cl. H01l 7/48
U.S. Cl. 148—186 7 Claims

ABSTRACT OF THE DISCLOSURE

A method for preparing germanium crystals exhibiting an intrinsic region for nuclear radiation detector applications includes preparing single lattice germanium crystals having a gallium dopant therein. Lithium is then drifted at a relatively rapid rate through the crystal by effecting the drifting operation in the presence of infrared radiation.

DISCLOSURE OF INVENTION

This invention relates to semiconductor processing and, more specifically, to an improved method for drifting lithium through doped germanium crystals.

The utilization of semiconductor crystals to detecct nuclear radiation has long been theoretically recognized. It is only recently, however, that practical semiconductor devices for sensing radiation with high energy distribution resolution have been fabricated.

An important nuclear sensing device finding wide utility in the lithium drift detector which is made by depositing lithium on the face of a germanium crystal which is essentially pure aside from a p-type dopant. The lithium is allowed to drift into and nearly through the germanium crystalline lattice, and is operative to neutralize electrically the p-type dopant throughout most of the length of the crystal.

The resulting PIN germanium device, having a central intrinsic region and terminal portions exhibiting an excess of p- and n-type carriers, is placed between two electrodes which are supplied with a reverse-biasing direct current potential and cooled. When radiated photons impinge upon the crystal, ionization of the germanium occurs and charged electron-hole pairs move in the direction of the potential gradient established by the direct voltage. The flow of charged electron-hole pairs is sensed as a current pulse in the external circuit, with the character of the current pulse supplying the desired information about the incident radiation.

The energy spectrum resolution and detecting properties of such detectors are directly limited by the number of free carriers (impurities) contained in the germanium. Such free carriers produce a quiescent current flow between the collecting electrodes which essentially masks out photon-caused current pulses significantly below this threshold quiescent level. Hence, the quality of such semiconductor radiation detectors are dependent upon a source of pure, intrinsic germanium.

However, the lithium applied at or near the extremity of a gallium doped germanium crystal drifts through the crystal at a very slow nonlinear rate, typically in the range from several millimeters to a fraction of a millimeter per day. For detector applications, relatively large crystals of the order of 50 mm. in size are required to yield the desired energy spectrum information. Accordingly, the prior art drifting process consumes many days in the preparation of a single crystal. This comprises a severe handicap in the batch processing of such crystals, and is also an onerous burden for special radiation monitoring situations which require a more rapid production of metering apparatus.

It is therefore an objective of the present invention to provide an improved method for processing germanium crystals.

More specifically, an objective of the present invention is the provision of a method for drifting lithium through doped germanium crystals at a relatively rapid rate.

The above and other objectives, features and advantages of the present invention are realized in an illustrative method for preparing nuclear radiation detector grade crystals, having an intrinsic region substantially free of quiescent electrical current carriers, by the lithium drift process. The germanium is first formed into a single crystalline lattice, purified of unknown contaminants, especially oxygen and oxygen compounds, and doped with gallium or other group III elements as disclosed in detail in a pending application of Charles Wenzel, Ser. No. 701,853, filed Jan. 31, 1968.

In brief, the requisite germanium may be purified and formed into a single crystal lattice by zone refining (leveling) a seed crystal and a germanium rod of a high resistivity in an atmosphere of substantially pure hydrogen. The resulting germanium is extremely pure and free of oxygen contaminants, and characterized by a unitary lattice structure. During the last zone-refining pass over the germanium a dopant, for example, germanium-gallium, is introduced into the germanium lattice, as by depositing a gallium-containing germanium pellet into the liquid state germanium melt zone. The gallium is readily accepted in the germanium lattice. As an alternate to the above-described zone-refining process, the Czochralski method of preparing crystals may be employed. In this process, the requisite crystal is grown by slowly drawing a seed crystal from a crucible containing refined liquid state germanium having the gallium dopant therein.

The resulting single lattice germanium crystal produced by either of the above described processes is unsatisfactory for detector applications by reason of the relatively low resistivity attributable to the dopant gallium atoms therein. To neutralize the gallium, lithium is inserted on one face of the crystal, as by evaporation or by depositing a lithium-bearing suspension or solution thereon. The doped crystal is then placed in an oven at a relatively high temperature, e.g., 400° C., and then cooled. Consequently, an excess concentration of lithium atoms is created up to a depth of approximately 300 microns in the crystal. After a reverse-biasing electrical potential is impressed across the lithium-bearing germanium crystal, the lithium atoms are permitted to translate (drift) most of the way therethrough. When a drifting lithium atom encounters a gallium atom in the lattice structure, the lithium and gallium atoms form an electrically inert gallium-lithium couplet which does not affect radiation measurements, i.e., which supplies no background electrical noise current to detector electrodes in the absence of incident radiation.

The resulting germanium detector device, prepared as above described, comprises a PIN semiconductor device. The N and P regions respectively comprise the terminal portions of the composite crystal device where the lithium was introduced and is the predominant dopant, and the crystal portion where the lithium was not permitted to drift and where the gallium dopant predominates. The region between the N and P type terminal crystal portions is essentially intrinsic, i.e., free of excessive current carriers of either type.

For potentials of the order of magnitude typically employed, e.g., 400 volts, the drift rate for the lithium requires on the order of 100 days to manufacture a typical 50 millimeter detector crystal. This very slow drift rate of the lithium through the germanium crystal comprises a great handicap in the fabrication of crystals having a detector grade intrinsic region. We have discovered that the drifting rate of the lithium atoms through the germanium is greatly increased by exposing the germanium lattice to infrared radiation during the lithium drifting process. The exact mechanism for increasing the drift rate is uncertain at this time. However, for explanatory purposes only, and without limiting the scope of the present invention, it is thought that the infrared photons impinging on the crystal lattice stimulate the germanium lattice to increase the probability of the drifting lithium moving beween allowable jump sites. The lithium atoms thus move more rapidly through the germanium crystal and more quickly neutralize the gallium dopant atoms.

As a further aspect of our invention, the drift rate of the lithium atoms through the germanium crystal increases still further when coherent infrared radiation is employed. The coherent radiation may be generated by known pumping and artificial stimulation techniques as embodied, for example, in conventional laser apparatus.

As yet another aspect of the present invention, the rate of drift of the lithium through the final crystal can be accelerated by stoichiometrically balancing most of the gallium with lithium during the refining and doping process. More specifically, when the gallium dopant is inserted in the germanium crystal lattice during a zone leveling pass, or a crystal growing drawing operation, a lithium laden gas, such as lithium hydride which vaporizes below the germanium melting temperature, is stoichiometrically introduced into the refining process, i.e., introduced in a carefully measured amount to supply enough lithium atoms to neutralize most, but not quite all of the gallium dopant. Consequently, the final crystal is essentially free of all unknown impurities; contains a number of inert gallium-lithium couplets; and also includes a relatively small number of unneutralized gallium atoms.

When additional lithium is deposited on, and drifted through the crystal in the presence of infrared radiation, either coherent or non-coherent, the rate of drift will be accelerated beyond that occurring if the stoichiometric balancing operation were not employed. This is attributable to the combined effects of the radiation stimulation of the drifting atoms, and to the incidence of fewer gallium atoms remaining in the crystal to be neutralized.

It is to be understood that the above-described semiconductor processing is only illustrative of the principles of the present invention. Numerous other modes of operation may be employed by those skilled in the art without departing from the spirit and scope thereof.

What is claimed is:

1. A method for preparing a detector grade PIN germanium crystal by drifting lithium through a doped germanium crystal, the improvement comprising the step of impinging infrared radiation on the doped germanium crystal during the lithium drifting operation.

2. A method as in claim 1 wherein said infrared radiation is coherent.

3. A method as in claim 1, wherein said germanium dopant comprises gallium, and further comprising the step of doping said germanium crystal in proximity to a source of lithium stoichiometrically measured with respect to said gallium.

4. A method for preparing a germanium crystal which includes an intrinsic region comprising the steps of continuously adding refined germanium by a solidifying process from a liquid state source thereof doped with gallium onto a seed crystal characterized by a single crystalline lattice structure, introducing lithium into said crystal, exposing said crystal to infrared radiation, and drifting said lithium through said crystal.

5. A method as in claim 4 wherein said infrared radiation is coherent.

6. A method as in claim 4 wherein said crystal preparation is effected in an atmosphere of substantially pure hydrogen.

7. A method as in claim 6 wherein said doping of said germanium crystal with gallium is effected in proximity to a source of lithium stoichiometrically measured with respect to said gallium.

References Cited

UNITED STATES PATENTS

| | | | |
|---|---|---|---|
| 3,310,443 | 3/1967 | Fessier et al. | 148—188 |
| 3,498,852 | 3/1970 | Jamini | 148—186 |

L. DEWAYNE RUTLEDGE, Primary Examiner

R. A. LESTER, Assistant Examiner

U.S. Cl. X.R.

29—584; 148—1.5, 188